United States Patent
Gannon

(10) Patent No.: US 7,209,053 B2
(45) Date of Patent: Apr. 24, 2007

(54) SYSTEM AND METHOD FOR DISPLAYING VALIDITY OF AIRPORT VISUAL APPROACH SLOPE INDICATORS

(75) Inventor: Aaron J. Gannon, Anthem, AZ (US)

(73) Assignee: Honeywell International Inc., Morristown, NJ (US)

( * ) Notice: Subject to any disclaimer, the term of this patent is extended or adjusted under 35 U.S.C. 154(b) by 196 days.

(21) Appl. No.: 11/099,757

(22) Filed: Apr. 6, 2005

(65) Prior Publication Data

US 2006/0227014 A1 Oct. 12, 2006

(51) Int. Cl.
*G08B 21/00* (2006.01)
*G08G 5/00* (2006.01)
*G06F 17/50* (2006.01)
*G01C 21/00* (2006.01)
*G01C 21/30* (2006.01)

(52) U.S. Cl. .................. 340/972; 340/945; 340/948; 340/953; 340/955; 340/973; 340/976; 703/13; 703/14; 701/207; 701/211; 701/213

(58) Field of Classification Search ........ 340/945–946, 340/953–955, 972, 976; 703/13–14; 701/207–213
See application file for complete search history.

(56) References Cited

U.S. PATENT DOCUMENTS

| | | | |
|---|---|---|---|
| 3,946,358 A | | 3/1976 | Bateman |
| 4,210,930 A | * | 7/1980 | Henry .................... 348/117 |
| 4,554,543 A | * | 11/1985 | Wyatt et al. ............. 340/948 |
| 5,661,486 A | * | 8/1997 | Faivre et al. ............ 342/33 |

(Continued)

FOREIGN PATENT DOCUMENTS

GB 1475442 6/1977

Primary Examiner—Daniel Wu
Assistant Examiner—Lam Pham
(74) Attorney, Agent, or Firm—Fogg & Powers LLC; Richard J. Moura; David N. Fogg

(57) ABSTRACT

An improved system and method are disclosed for indicating the validity of airport runway visual approach slope indicators on an aircraft display. An aircraft display system is provided, which includes a database for storing data about the specific visual approach slope lighting indicator system being used by each airport of a plurality of airports and any special distance and/or usage limitations associated with each such visual approach slope indicator system, a processing unit, a position determination unit, and a visual display. As an aircraft approaches an airport, the processing unit receives the aircraft's current position from the position determination unit, and compares the aircraft's current position data with the distance and/or usage limitation data stored in the database for the approach slope indicator system being used by that airport. If the processing unit's comparison of the aircraft's current position data and the airport's distance and/or usage data indicates that the visual approach slope lighting indicator system is within a valid range, then the processing unit provides a display format of a simulated airport environment for the airport of interest to the visual display, which includes a symbolic presentation of the airport's visual approach slope lighting indicators associated with the aircraft's current position, along with appropriate colors for the lighting elements being displayed. However, if the processing unit's comparison of the aircraft's current position data and the airport's distance and/or usage data indicates that the visual approach slope lighting indicator system is not within a valid range, then the processing unit provides a display format of a simulated airport environment for the airport of interest to the visual display, which includes a symbolic presentation of the airport's visual approach slope lighting indicators with the lighting elements capped, for example, with a red X symbol. Therefore, in this manner, the accuracy, availability and validity of the lighting system, and the safety of the aircraft's approach and landing are significantly improved.

22 Claims, 4 Drawing Sheets

U.S. PATENT DOCUMENTS

| | | |
|---|---|---|
| 5,936,552 A | 8/1999 | Wichgers et al. |
| 6,028,535 A | 2/2000 | Rizkin |
| 6,653,947 B2 | 11/2003 | Dwyer et al. |
| 6,809,657 B1 * | 10/2004 | Parker et al. ............... 340/945 |
| 2002/0099528 A1 * | 7/2002 | Hett ........................... 703/13 |
| 2004/0160341 A1 | 8/2004 | Feyereisen et al. |

* cited by examiner

SYSTEM AND METHOD FOR DISPLAYING VALIDITY OF AIRPORT VISUAL APPROACH SLOPE INDICATORS

FIELD OF THE INVENTION

The invention relates generally to the field of display systems, and more specifically, but not exclusively, to a system and method for displaying the validity of airport visual approach slope indicators on an aircraft display.

BACKGROUND OF THE INVENTION

Techniques for displaying simulated airport visual approach glideslope indicators on aircraft cockpit displays are known. An example of such a technique is disclosed in commonly assigned U.S. Patent Application Publication No. US 2002/0099528 A1 to Charles L. Hett ("Hett"), which is incorporated herein by reference in its entirety. As described in Hett, aircraft landing at airports during marginal Visual Meteorological Conditions (VMC) or in situations where there are reduced visual cues (e.g., night flights) are aided by an Instrument Landing System (ILS). An ILS provides a radio beam that originates on the ground at an ILS-equipped airport and generates a glideslope that an aircraft can follow during an instrument approach to the runway. The ILS radio beam is detected by equipment onboard the aircraft and provides lateral, along-course, and vertical guidance to aircraft attempting to land at that airport. However, some airports do not have an ILS-generated radio glideslope.

Nevertheless, airports may substitute for an ILS and/or provide airport lighting aids in addition to the ILS, as described in the U.S. Federal Aviation Administration's (FAA's) publication entitled "Aeronautical Lighting and Other Airport Visual Aids." The airport lighting aids may provide vertical visual approach slope guidance to the runway, which is especially useful during marginal VMC or in situations where there are reduced visual cues. For example, various existing Approach Lighting Systems (ALSs) provide techniques that can be used by flight crews to transition from instrument flight to visual flight in order to land. An ALS provides a directional pattern of high intensity signal lights that start at a landing threshold of the runway, and extend a prescribed distance into the approach area. The signal lights shine upwardly toward the aircraft along the approach slope or glide path and visually guide the pilot during the approach and landing. Some ALSs include sequenced flashing lights which appear to the pilot as a ball of light traveling towards the runway at high speed.

A well known airport lighting aid is the Precision Approach Path Indicator (PAPI) system. The PAPI system uses a single row of either two or four light units, which have a visual range of about 5 miles during the day and up to 20 miles at night. Typically, the row of light units is installed on the left side of the runway. The two or four identical light units are arranged on the side of the runway in a line perpendicular to the runway centerline to define the visual glide path angle. Each light unit has a white segment in an upper part of the beam and a red segment in a lower part of the beam, with the segments separated by a pink transition zone. In a two-light PAPI system, the lights are positioned and aimed to produce a signal presentation wherein a pilot, in an aircraft which is on or close to the established approach path, sees the light unit nearest the runway as red and the second light unit as white. If the aircraft is above the approach path, the pilot sees both light units as white. If the aircraft is below the approach path, the pilot sees both light units as red.

In a four-light PAPI system, the signal presentation is such that a pilot, in an aircraft which is on or close to the established approach path, sees the two light units nearest the runway as red, and the two light units farthest from the runway as white. If the aircraft is above the approach path, the pilot sees the light unit nearest the runway as red, and the three light units farthest from the runway as white. If the aircraft is further above the approach path, the pilot sees all of the light units as white. If the aircraft is below the approach path, the pilot sees the three light units nearest the runway as red, and the light unit farthest from the runway as white. If the aircraft is further below the approach path, the pilot sees all of the light units as red.

The Visual Approach Slope Indicator (VASI) system is another well known airport lighting aid system. The VASI system provides a visual glide path angle by directing a beam of light at approaching aircraft to indicate to the pilot whether the aircraft is within the appropriate glide path for approaching the intended runway. VASI systems are visible at a range of about 3–5 miles during the day, and up to 20 miles or more at night. However, VASI systems are typically arranged to provide visual descent guidance information during the approach but after the aircraft is visually aligned with the runway. Lateral course guidance is provided independently by the runway or runway lights.

VASI system installations are typically 2, 4, 6, 12 or 16 light units arranged in parallel to the runway centerline or as bars (commonly referred to as near, middle and far bars). Typical VASI installations can be 2 bars, near and far, and may include 2, 4 or 12 light units. Two-bar VASI installations provide one visual glide path which is normally set at 3 degrees. Some VASI installations are three bars spaced intermittently along one or both sides of the runway, near, middle and far, to provide an additional visual glide path to accommodate high cockpit aircraft. Three-bar VASI installations provide two visual glide paths. The lower glide path is provided by the near and middle bars and is typically set at 3 degrees, while the upper glide path, which is provided by the middle and far bars, is typically ¼ degree higher. This higher glide path is intended for use only by high cockpit aircraft to provide a sufficient Threshold Crossing Height (TCH). VASI installations having 2, 4 or 6 light units are located on one side of the runway (typically the left side). If a VASI installation includes 12 or 16 light units, they can be located on both sides of the runway.

The basic principle of the VASI system is that the colors are differentiated between red and white. Each light unit aims a narrow split beam of light at approaching aircraft. Each light has a white segment in the upper part of the beam and a red segment in the lower part of the beam, and the transition zone between segments is pink. The light units are arranged so that a pilot using the VASI system during an approach sees the combination of lights for a 2-bar VASI (4 light unit) system. For example, the farthest light unit of a two-unit system is aligned and positioned so that the bottom of the red or lower segment is parallel to the glide path and forms the upper limit of an ideal glide path for the runway. In such a system, the light unit closest to approaching aircraft is aligned and positioned so that the top of the white or upper segment is aimed into the glide path, and the bottom of the white segment is substantially parallel to the glide path and forms the lower limit of the ideal glide path. If an aircraft is on the proper glide path, the closest light unit appears to be white to the pilot, and the farthest light unit appears to be red. If the approach is too high, both light units appear to be white. If the approach is too low, both light units appear to be red.

Another known airport lighting aid system uses a tri-color lighting technique. Typically, tri-color visual approach slope indicators are arranged as a single light unit that projects a three-color visual approach path into the final approach area of the runway. The below glide path indication is red, the above glide path indication is amber, and the on glide path indication is green. Tri-color visual approach slope indicators have a visual range of approximately one-half mile to one mile during the day, and up to five miles at night.

A fourth known airport lighting aid system uses a pulsating light. The visual approach slope indicators are arranged as a single light unit that projects a two-color visual approach path into the final approach area of the runway. The on glide path indication is a steady white light. The slightly below glide path indication is a steady red light. If the aircraft descends further below the glide path, the red light starts to pulsate. The above glide path indication is a pulsating white light. The pulsating rate increases as the aircraft deviates further above or below the desired glide path. The visual range of the pulsating light system is about 4 miles during the day, and up to 10 miles at night.

However, a significant problem with the existing airport lighting aids, such as the PAPI, VASI and other visual approach indicators, is that although the approach lighting systems at an airport can be visible at a range of 10 miles or more, the validity of the lighting systems (e.g., in terms of accuracy and landing safety) for visually indicating a glide path is limited to a distance which is less than 5 miles from the airport. Furthermore, the validity of the lighting systems for indicating a glide path is also dictated by the type of approach slope lighting indicator system being used (e.g., PAPI, VASI, etc.). Notably, a recent near-accident of a corporate jet near Scottsdale, Ariz. can be attributed to the flight crew's unawareness or disregard of the variable distance versus lighting system validity problems that affect the accuracy and safety of an airport's approach slope lighting indicator system. In any event, another significant problem with the existing airport lighting aids is that the compelling nature of the lights can cause flight crews to take an "on glide path" indication at face value, regardless of the aircraft's distance to the airport. Consequently, if an aircraft is more than 5 miles from an airport, an apparent (to the flight crew) visual indication that the aircraft is on the glide path is likely incorrect (with significant potential airport and landing safety consequences). Therefore, it would be advantageous to have a system and method for displaying the validity of airport visual approach slope indicators on an aircraft display. As described in detail below, the present invention provides such a system and method, with an aircraft display that indicates the validity of airport visual approach slope indicators.

SUMMARY OF THE INVENTION

The present invention provides an improved system and method for indicating the validity of airport visual approach slope indicators on an aircraft display. In accordance with a preferred embodiment of the present invention, an aircraft display system is provided, which includes a database for storing pertinent data associated with the specific visual approach slope lighting indicator system being used by each airport of a plurality of airports and any special distance and/or usage limitations associated with each such visual approach slope indicator system, a processing unit, a position determination unit, and a visual display. As an aircraft approaches an airport, the processing unit receives the aircraft's current position from the position determination unit, and compares the aircraft's current position data with the distance and/or usage limitation data stored in the database for the approach slope indicator system being used by that airport. For this example embodiment, if the processing unit's comparison of the aircraft's current position data and the airport's distance and/or usage limitation data indicates that the visual approach slope lighting indicator system is within a valid range, then the processing unit provides a display format of a simulated airport environment for the airport of interest to the visual display, which includes a symbolic presentation of the airport's visual approach slope lighting indicators associated with the aircraft's current position, along with appropriate colors for the lighting elements being displayed. However, if the processing unit's comparison of the aircraft's current position data and the airport's distance and/or usage limitation data indicates that the visual approach slope lighting indicator system is not within a valid range, then the processing unit provides a display format of a simulated airport environment for the airport of interest to the visual display, which includes a symbolic presentation of the airport's visual approach slope lighting indicators with the lighting elements capped, for example, with a red X symbol. Therefore, by indicating with a simulated visual display the validity or invalidity of an airport's visual approach slope lighting indicators apparently being seen by the flight crew, the present invention significantly improves the accuracy, availability and validity of the approach slope indicator system being used, and the safety of the aircraft's approach and landing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
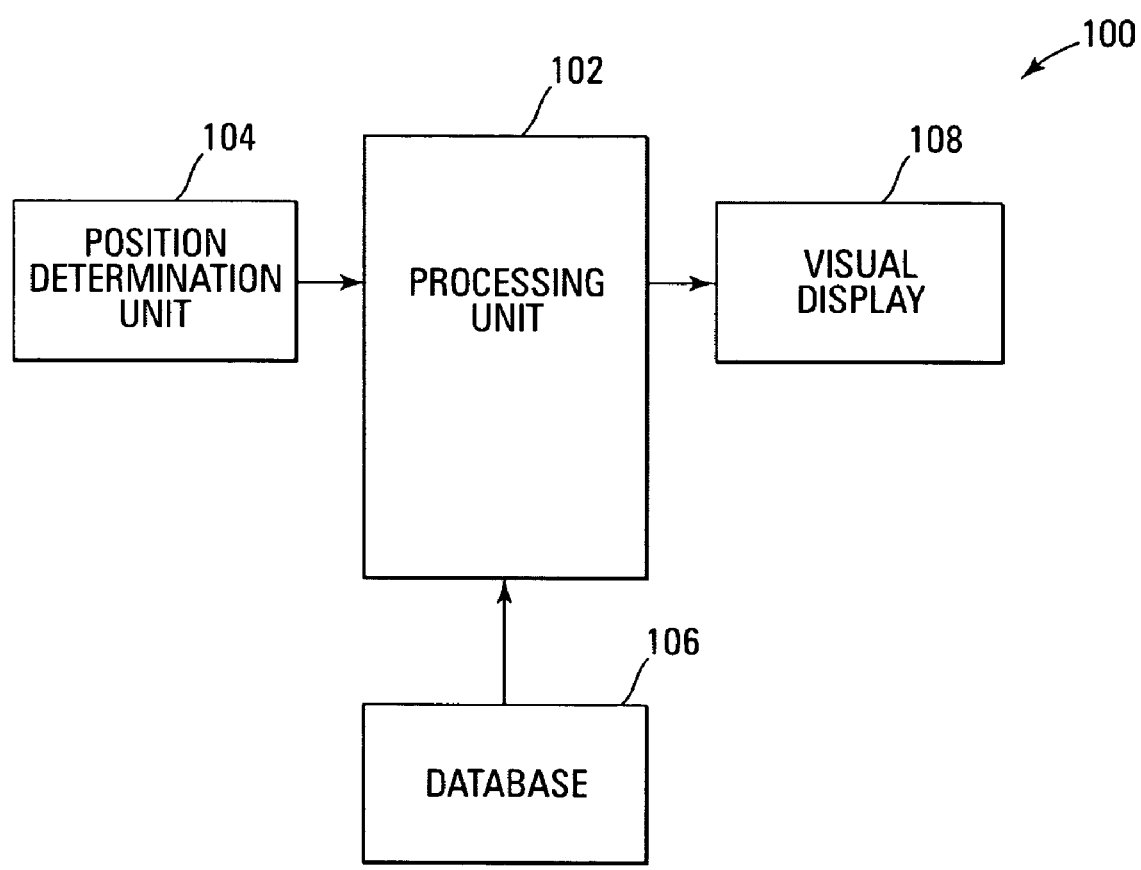
FIG. 1 depicts a block diagram of an example system for indicating the validity of airport runway visual approach slope indicators on an aircraft display, which can be used to implement a preferred embodiment of the present invention.

With reference now to the figures, FIG. 1 depicts a block diagram of an example system 100 for indicating the validity of airport runway visual approach slope indicators on an aircraft display, which can be used to implement a preferred embodiment of the present invention. For this example embodiment, system 100 includes a processing unit 102, a position determination unit 104, a database 106, and a visual display 108. Notably, it should be understood that although system 100 appears in FIG. 1 to be arranged as an integrated system, the present invention is not intended to be so limited and can also include an arrangement whereby one or more of processing unit 102, position determination unit 104, database 106 and visual display 108 is a separate component or a subcomponent of another system located either onboard or external to an aircraft. Also, for example, system 100 can be arranged as an integrated system (e.g., aircraft display system, etc.) or a subsystem of a more comprehensive aircraft system (e.g., navigational system, approach and/or landing system, etc.).

For this embodiment, processing unit 102 can be a computer processor such as, for example, a microprocessor, digital signal processor, or any suitable processor capable of at least receiving and/or retrieving data associated with an aircraft's current position, and also retrieving data associated with the visual approach slope lighting indicator system being used by a specific airport of interest, along with any special distance and/or usage limitation data associated with that visual approach slope indicator system, comparing the aircraft's current position data with the retrieved special distance and/or usage limitation data, generating display control signals for a visual display responsive to the comparison, and sending the generated display control signals to a visual display (e.g., visual display 108 in FIG. 1).

For example, processing unit 102 can be arranged as a single processor or plurality of processors connected to a data communications bus or system bus. A memory controller/cache can also be connected to the data communications bus or system bus, which can provide an interface between processing unit 102 and a local memory (e.g., RAM, ROM, etc.). A plurality of machine instructions can be stored in the local memory and retrieved and operated on by processing unit 102 to generate the control signals for the visual display. An Input/Output (I/O) bus bridge can also be connected to the data communications bus or system bus, which can provide an interface between processing unit 102 and an I/O bus. Thus, processing unit 102 can receive, retrieve and/or send data via such an I/O bus. In any event, those of ordinary skill in the art will appreciate that the hardware described herein for processing unit 102 in FIG. 1 may vary. As such, the depicted example is provided for illustrative purposes and not meant to imply architectural limitations with respect to the present invention.

For this embodiment, system 100 also includes a position determination unit 104 coupled to processing unit 102 (e.g., via an I/O bus connection). For example, position determination unit 104 can provide navigation data associated with the aircraft's current position to processing unit 102. Position determination unit 104 can obtain the navigation data from an onboard navigation system that can include, for example, an inertial navigation system, a satellite navigation system (e.g., Global Positioning System) receiver, VLF/OMEGA, Loran C, VOR/DME, DME/DME, IRS, or from a Flight Management System (FMS). The navigation system can also provide information to position determination unit 104 about the aircraft's altitude relative to sea level, if such information is needed. In any event, for this example embodiment, position determination unit 104 can include any suitable position determination device that is capable of providing processing unit 102 with an aircraft's current position (e.g., in latitudinal and longitudinal form).

System 100 also includes a database 106 coupled to processing unit 102 (e.g., via an I/O bus connection). For this example embodiment, database 106 is a memory device (e.g., non-volatile memory, disk, drive, tape, mass storage device, etc.) that can store digital data associated with a plurality of airports, which includes data associated with the visual approach slope lighting indicator system being used by each airport of the plurality of airports, and also data associated with any special distance and/or usage limitations for each such airport and visual approach slope indicator system being used. For example, database 106 can store, for each airport included in the database, such data as the airport's location (e.g., latitudinal and longitudinal position), the effective visual distance for the visual approach slope lighting indicator system being used, measured and/or estimated distances where the accuracy of the visual approach slope lighting indicator system is degraded below a predetermined level, and any other limitation(s) deemed to significantly degrade the accuracy of the visual approach slope lighting indicator system being used (e.g., locations and elevations of obstacles that can impede or degrade a pilot's visual perception of visual approach slope lighting indicators being used, such as mountains, other elevated ground areas, and man-made obstacles such as radio antenna towers, buildings, bridges, etc.).

For this example embodiment, system 100 also includes a visual display 108 coupled to processing unit 102 (e.g., via an I/O bus connection). Using an aircraft's current position data retrieved (or received) from position determination unit 104 and the airport and visual approach slope lighting indicator system data from database 106, processing unit 102 executes one or more algorithms for generating a plurality of display control signals. Processing unit 102 sends the plurality of display control signals to visual display 108. Preferably, for this embodiment, visual display 108 is an aircraft cockpit display. Visual display 108 interprets the received plurality of display control signals and generates suitable simulated visual airport/runway and approach or glide slope indicator symbols, which are presented on a screen of visual display 108. Notably, although a conventional cockpit display screen may be used to display the simulated airport/runway and glide slope indicator information, the present invention is not intended to be so limited and can include any suitable type of display medium capable of visually presenting simulated airport/runway approach and/or glide slope indicator information for a pilot (e.g., Primary Flight Display or PFD, Heads Down Display or HDD, Heads Up Display or HUD, CRT display, LCD, LED or OLED display, plasma display, projection display, etc.).

Figure 2:
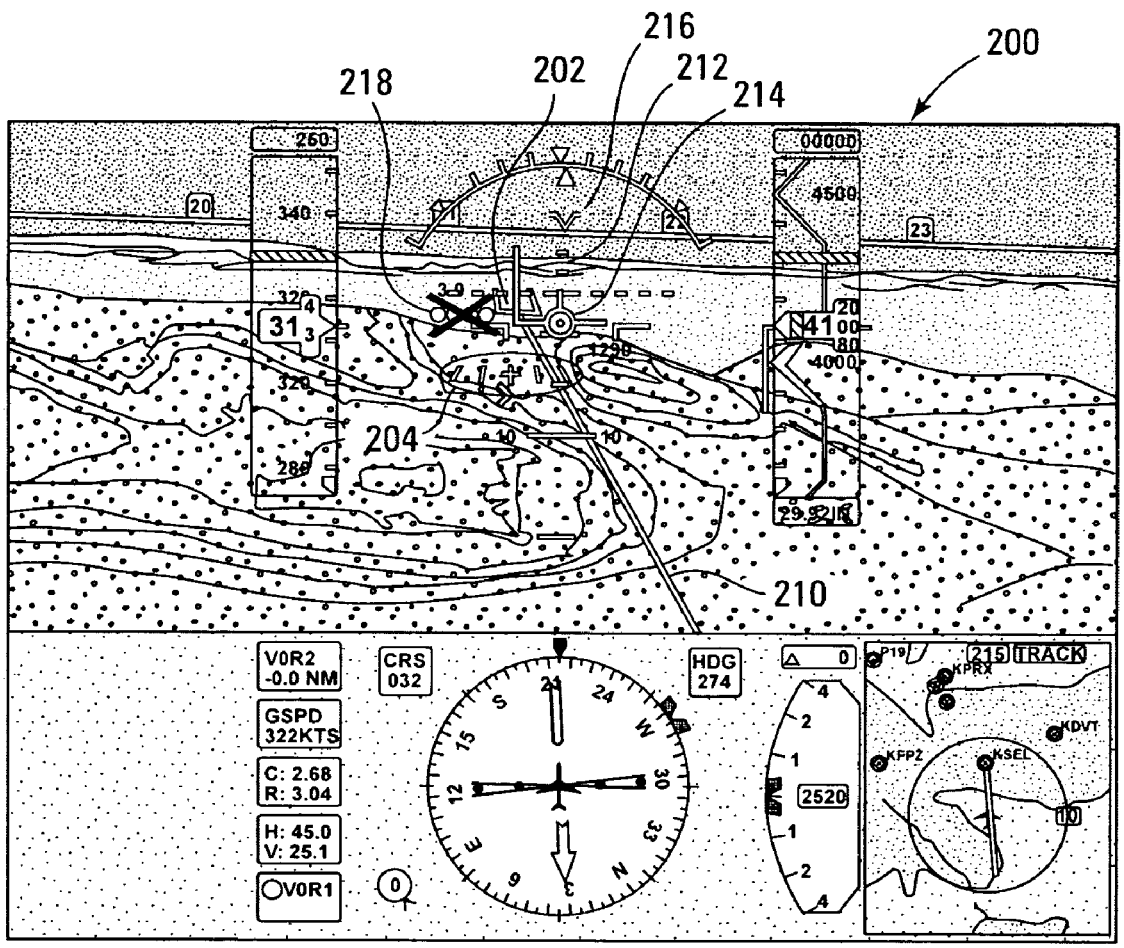
FIG. 2 depicts a pictorial representation of an aircraft display, which may be used to illustrate a preferred embodiment of the present invention.

FIG. 2 depicts a pictorial representation of an aircraft display 200, which may be used to illustrate a preferred embodiment of the present invention. For this example embodiment, aircraft display 200 represents a cockpit display such as, for example, a PFD, HDD or HUD. However, the present invention is not intended to be so limited and can include any suitable display that can provide for a pilot a simulated display of a visual airport/runway approach or glide slope indicator, which includes images that conform to actual features on the ground as seen from an aircraft's cockpit. Examples of PFDs that can be used are the DU-1080 and DU-1310 Display Units, which are color active matrix LCD-based devices provided by Honeywell International, Inc. of Morristown, N.J. An example HUD that can be used is the HUD2020 device also provided by Honeywell International, Inc. In any event, display 200 includes a conformal airport/runway symbol 202. The airport portion of symbol 202 can be used when the aircraft is higher than 1,000 feet above ground level (AGL), because the relative size of the airport makes it visible from this altitude. As the aircraft approaches the ground, the runway portion of symbol 202 appears (e.g., as illustrated in display 200), and the airport portion is removed.

When the aircraft is within range, a pilot begins looking for the runway. During marginal VMC or in situations where there are reduced visual cues (e.g., night flight), the runway may not be visible to the pilot. Therefore, the runway portion of symbol 202 is presented on simulated display 200 to replicate cues basic to visual flight. Display 200 also provides a conformal lateral deviation display 204, which includes a conformal deviation centerline and conformal lateral deviation scale. Conformal lateral deviation display 204 represents the aircraft's desired course and course deviation along the ground. Similar to runway symbol 202, conformal lateral deviation display 204 appears conformal to a flat surface on the ground. Display 200 also presents texturing on the ground and color gradations (not shown) on both the ground (e.g., shades of brown and/or green) and the sky (e.g., shades of blue).

Display 200 also presents a conformal lateral path indicator 210, a ball/attitude indicator 212, and a Flight Path Vector indicator (214). The conformal lateral path indicator 210 indicates a colored (not shown) path to the current and next waypoint and is constructed to appear conformal to a flat surface on the ground. The ball/attitude indicator 212 indicates the aircraft's attitude and is displayed large enough so that a pilot can more readily discriminate and correct for upsets to pitch because of the increased peripheral field of view. The FPV indicator 214 indicates the aircraft's track, or a point (e.g., on the ground) at which the aircraft is aimed.

During VMC, pilots may use certain landmarks (e.g., mountain peak) on the horizon as a guide to a destination. However, when flying Instrument MC (IMC), such visual landmarks are not available. Consequently, display 200 provides a lateral conformal current waypoint 216, which is represented as a colored triangular-shaped object on the horizon. The current waypoint 216 provides tactical situational awareness information for the pilot.

Notably, display 200 also provides a simulated visual glide path indicator 218. The simulated visual glide path indicator 218 provides the pilot with color coded information that is consistent with the visual information provided by a conventional airport lighting aid during a VMC approach. The simulated visual glide path indicator 218 displays familiar symbols, such as the PAPI, VASI symbols or other known symbols, which facilitate basic perceptual judgments for a pilot, such as, for example, whether the aircraft is high, low, or on the glide path. Notably, for this example embodiment, simulated visual glide path indicator 218 is shown and arranged as a four-light PAPI system located to the left of simulated runway symbol 202. However, the specific arrangement shown in FIG. 2 is provided for illustrative purposes only. The present invention is not intended to be so limited and can include one or more symbols representing any suitable visual approach slope lighting indicator system that can be representatively displayed on an aircraft cockpit display (e.g., visual display 108 in FIG. 1).

For a PAPI system (e.g., as shown in FIG. 2), the simulated visual glide path indicator (e.g., simulated visual approach slope lighting indicator) 218 can show a directional pattern of simulated red and white lights perpendicular to the runway centerline. However, in accordance with the principles of the present invention, if the pilot's perception of the visual approach slope lighting indicator system actually being viewed at the airport is deemed to be invalid (as described in detail below), the simulated visual approach slope lighting indicator (or simulated visual glide slope indicator) 218 is shown on the display 200 with all color removed and capped with a suitable symbol (e.g., red X symbol) indicating data invalidity. Notably, in accordance with the principles of the present invention, the use of a red X symbol to indicate data validity of the simulated visual approach slope lighting indicator 218 is not intended as a limitation on the scope of the present invention, and any suitable visual indication for data invalidity may be used. For example, data invalidity of the simulated visual approach slope lighting indicator 218 may be indicated by a red (or uncolored) X, a red (or uncolored) international symbol with a circle and bar representing "not", a red X or international "not" symbol and removal of all colors from the simulated visual approach slope lighting indicator, removal of all colors from the simulated visual approach slope lighting indicator without a red X or international "not" symbol, etc.

Similarly, for a VASI system, a simulated visual glide path indicator (e.g., simulated visual approach slope lighting indicator) on display 200 would show a pattern of simulated red and white lights parallel to the runway centerline. However, in accordance with the principles of the present invention, if the pilot's perception of the visual approach slope lighting indicator system actually being viewed at the airport is deemed to be invalid (as described in detail below), the simulated visual approach slope lighting indicator (or simulated visual glide slope indicator) 218 for the VASI system would be shown on display 200 with, for example, all color removed and capped with a suitable symbol (e.g., red X symbol) indicating data invalidity. As such, these principles of the present invention with respect to displaying airport lighting aid system data validity or invalidity can be applied for any visual approach slope indicator system used (e.g., tri-color airport lighting aid system, pulsating airport lighting aid system, etc.).

FIGS. 3A–4B depict related pictorial representations showing example simulated displays of airport lighting aid systems, which may be used to illustrate one or more embodiments of the present invention. Additionally, FIG. 5 depicts a flow chart showing an exemplary method 500 for indicating the validity of airport and/or runway visual approach slope indicators on an aircraft display, in accordance with the one or more embodiments illustrated by the pictorial representations shown in FIGS. 3A–4B. Referring first to FIGS. 1 and 5, for this example, processing unit 102 retrieves (or receives) a host aircraft's current position information from position determination unit 104 (step 502). Processing unit 102 then retrieves pertinent data about the specific visual approach slope lighting indicator system (or airport lighting aid system) being used by a particular airport of interest, along with any special distance and/or usage limitation data associated with the visual approach slope indicator system being used, from database 106 (step 504). For example, a pilot may enter airport identification information for processing unit 102 to identify the particular airport of interest, or processing unit 102 may determine the identity of an airport of interest by its proximity to the aircraft, the aircraft's heading, etc.

Next, processing unit 102 executes a suitable algorithm to compare the retrieved current position information and the special distance and/or usage limitation information for the visual approach slope indicator system being used (step 506). For this example, the aircraft's current position information can represent the aircraft's current longitudinal and latitudinal position, and the special distance and/or usage limitation information can represent the aircraft's distance from the airport/runway of interest. From this comparison of the aircraft's current position information and the airport's special distance and/or usage limitation information, processing unit 102 then determines whether or not the simulated approach slope indicator data, glide slope indicator data, or airport lighting aid system data to be displayed (e.g., on visual display 108 of FIG. 1, or display 200 of FIG. 2) is valid (step 508).

If the comparison of the aircraft's current position information and the airport's special distance and/or usage limitation information (step 506) indicates that the simulated approach slope indicator data, glide slope indicator data, or airport lighting aid system data to be displayed for the pilot is valid (e.g., the aircraft is close enough to the airport of interest), then processing unit 102 generates visual display control signals to color code (e.g., red and/or white) simulated approach slope indicator lights representing the actual visual approach slope indicator lights for the airport involved (step 510). Processing unit 102 then sends the visual display control signals for the color coded simulated approach slope indicator lights to visual display 108 (step 512). For example, FIGS. 3A and 4A depict pictorial representations of example PAPI and VASI system simulated approach slope indicator lights that illustrate pertinent portions of such a display.

Figure 3A:
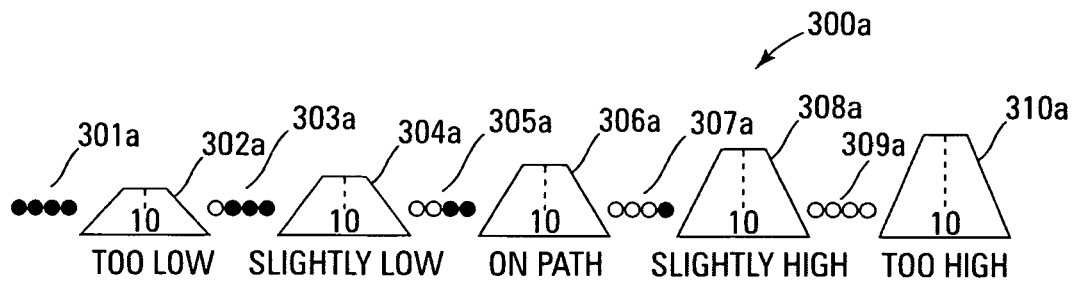
FIGS. 3A–3B depict example displays of a plurality of respective valid and invalid simulated PAPI system visual approach slope indicator lights, which may be used to illustrate one or more embodiments of the present invention.

Referring to FIG. 3A, example displays (e.g., on visual display 108) of a plurality of valid, simulated PAPI system visual approach slope indicator lights are shown. For example, the simulated display of indicator lights 301a with four red lights indicates that an aircraft's approach to runway 302a is too low, and this information is deemed to be valid. The simulated display of indicator lights 303a with one white light and three red lights indicates that the aircraft's approach to runway 304a is slightly low, and this information is deemed to be valid. The simulated display of indicator lights 305a with two white lights and two red lights indicates that the aircraft's approach to runway 306a is on glide path, and this information is deemed to be valid. The simulated display of indicator lights 307a with three white lights and one red light indicates that the aircraft's approach to runway 308a is slightly high, and this information is deemed to be valid. Finally, the simulated display of indicator lights 309a with four white lights indicates that the aircraft's approach to runway 310a is too high, and this information is deemed to be valid.

Figure 4A:
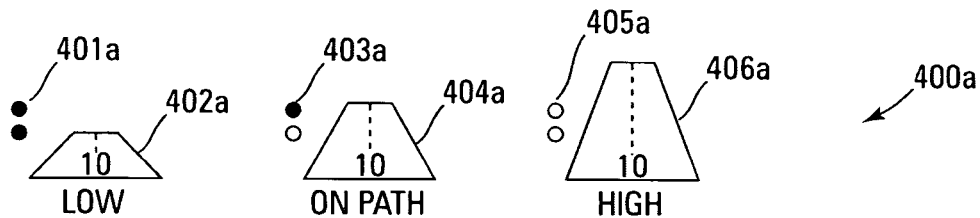
FIGS. 4A–4B depict example displays of a plurality of respective valid and invalid simulated VASI system visual approach slope indicator lights, which may be used to illustrate one or more embodiments of the present invention.
Figure 5:
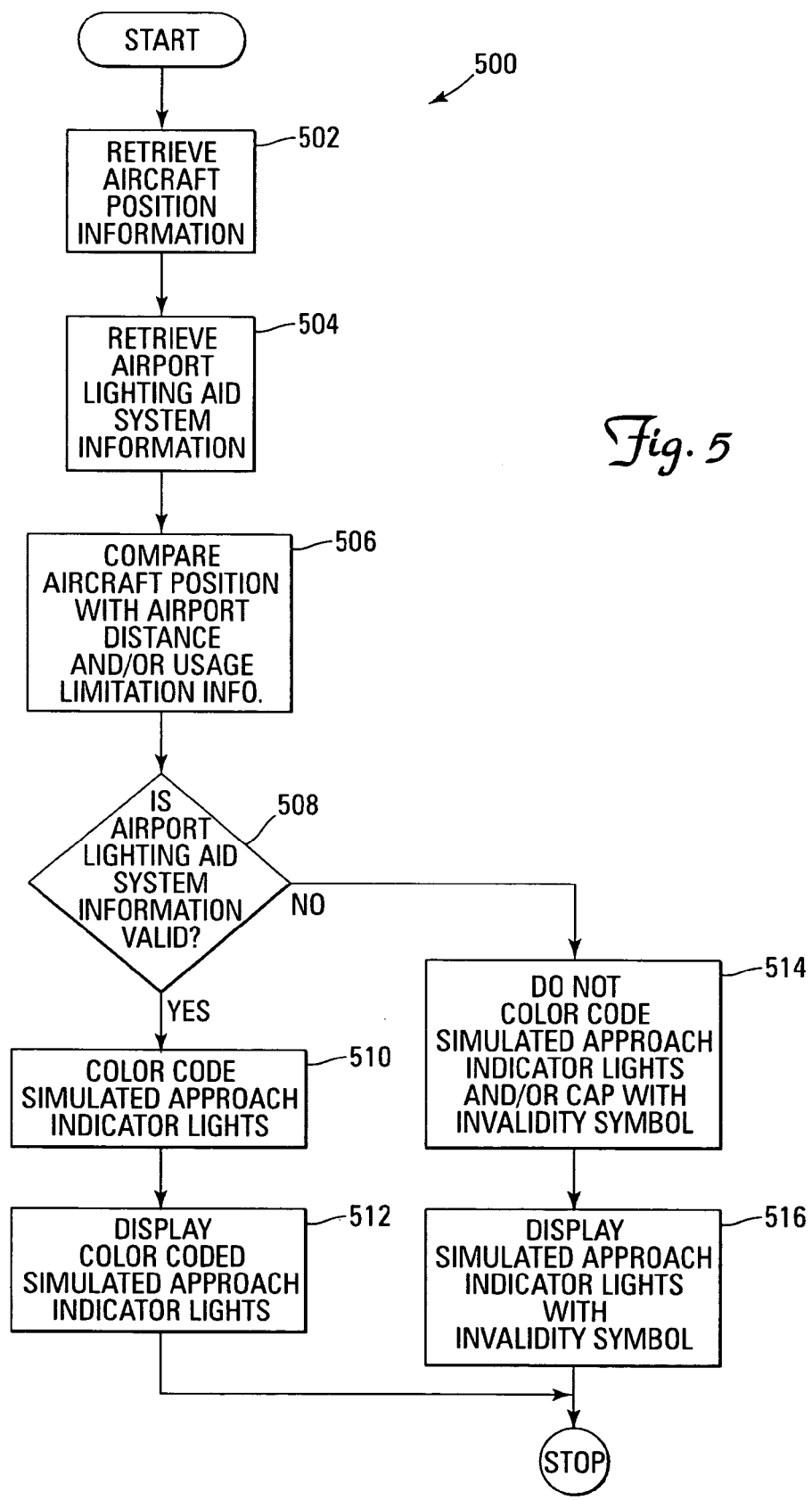
FIG. 5 depicts a flow chart showing an exemplary method for indicating the validity of airport and/or runway visual approach slope indicators on an aircraft display, in accordance with the one or more embodiments illustrated by the pictorial representations shown in FIGS. 3A–4B.

Referring to FIG. 4A, example displays (e.g., on visual display 108) of a plurality of valid, simulated VASI system visual approach slope indicator lights are shown. For example, the simulated display of indicator lights 401a with two red lights indicates that an aircraft's approach to runway 402a is low, and this information is deemed to be valid. The simulated display of indicator lights 403a with one white light and one red light indicates that the aircraft's approach to runway 404a is on glide path, and this information is deemed to be valid. The simulated display of indicator lights 405a with two white lights indicates that the aircraft's approach to runway 406a is high, and this information is deemed to be valid.

Returning to FIG. 5, in accordance with the principles of the present invention, if the comparison of the aircraft's current position information and the airport's special distance and/or usage limitation information (step 508) indicates that the simulated approach slope indicator data, glide slope indicator data, or airport lighting aid system data to be displayed for the pilot is invalid (e.g., the aircraft is beyond a predetermined distance threshold or not close enough to the airport of interest), then processing unit 102 generates visual display control signals that can alter the color code (e.g., red and/or white) of the simulated approach slope indicator lights representing the actual visual approach slope indicator lights for the airport involved (step 514), and generates a suitable invalidity symbol (e.g., red X or international "not" symbol) to cover the simulated approach slope indicator lights to be displayed. Processing unit 102 then sends the visual display control signals for the invalid simulated approach slope indicator lights to visual display 108 (step 516). For example, FIGS. 3B and 4B depict pictorial representations of example PAPI and VASI system simulated approach slope indicator lights that illustrate pertinent portions of such a display.

Figure 3B:
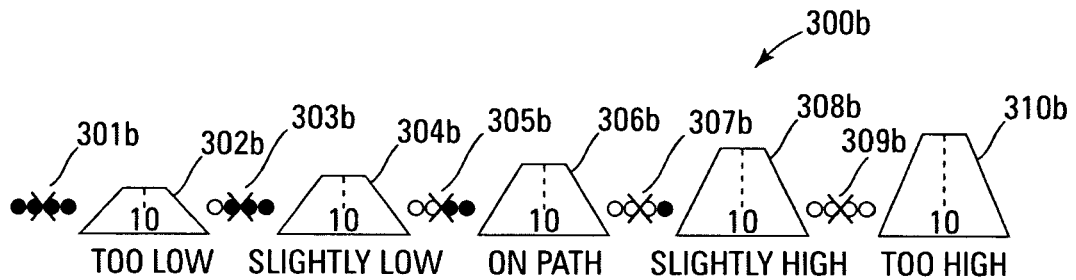

Referring to FIG. 3B, example displays (e.g., on visual display 108) of a plurality of invalid, simulated PAPI system visual approach slope indicator lights are shown. For example, the simulated display of indicator lights 301b capped with a red X symbol indicates that an aircraft's approach to runway 302b is too low, but this information is deemed to be invalid. As described earlier, as an option, but not intended as a limitation on the scope of the present invention, the simulated display of indicator lights 301b could have their color removed (or otherwise altered) and be capped with a red X or international "not" symbol, or the simulated display of indicator lights 301b could simply have their color removed (e.g., with no red X symbol). Similarly, the simulated display of indicator lights 303b capped with a red X symbol indicates that the aircraft's approach to runway 304b is slightly low, but this information is deemed to be invalid. Again, as an option, the simulated display of indicator lights 303b could have their color removed and be capped with a red X symbol. The simulated display of indicator lights 305b capped with a red X symbol indicates that the aircraft's approach to runway 306b is on glide path, but this information is deemed to be invalid. The simulated display of indicator lights 307b capped with a red X symbol indicates that the aircraft's approach to runway 308b is slightly high, but this information is deemed to be invalid. Finally, the simulated display of indicator lights 309b capped with a red X symbol indicates that the aircraft's approach to runway 310b is too high, but this information is deemed to be invalid.

Figure 4B:
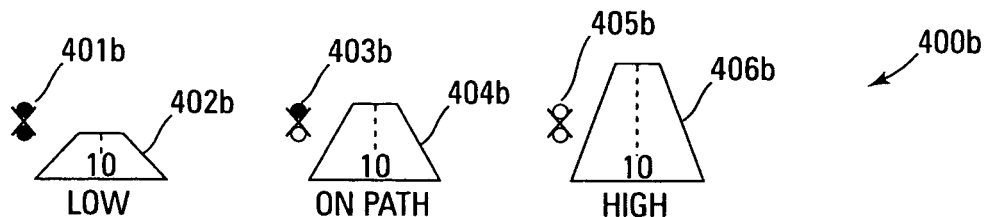

Referring next to FIG. 4B, example displays (e.g., on visual display 108) of a plurality of valid, simulated VASI system visual approach slope indicator lights are shown. For example, the simulated display of indicator lights 401b capped with a red X symbol indicates that an aircraft's approach to runway 402b is low, but this information is deemed to be invalid. Similarly, the simulated display of indicator lights 403b capped with a red X symbol indicates that the aircraft's approach to runway 404b is on glide path, but this information is deemed to be invalid. Finally, the simulated display of indicator lights 405b capped with a red X symbol indicates that the aircraft's approach to runway 406b is high, but this information is deemed to be invalid. As mentioned earlier, a similar technique may be used to indicate the invalidity of other airport lighting aids, such as, for example, tri-color or pulsating airport lighting aids. Also, the specific use of a red X symbol and the retention or removal of approach light color to represent invalid information are for illustrative purposes only and the present invention is not intended to be so limited. For example, any suitable indication that a simulated display of a visual approach slope indicator should be deemed invalid can be used, such as displaying color coded or non-colored approach lights with or without a suitable symbol representing invalidity (e.g., red X, international symbol for "not", etc.).

It is important to note that while the present invention has been described in the context of a fully functioning aircraft display system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular aircraft display system.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for displaying validity of visual approach slope indicators, comprising:
    a position determination unit, said position determination unit operable to determine a current position of an aircraft;
    a data storage unit, said data storage unit operable to store a first plurality of data elements associated with a plurality of validity factors for a plurality of visual approach slope indicator systems; and
    a processing unit coupled to said position determination unit and said data storage unit, said processing unit operable to:
    receive said current position of said aircraft from said position determination unit;
    retrieve a second plurality of data elements from said data storage unit, said second plurality of data elements associated with at least one validity factor of said plurality of validity factors for one visual approach slope indicator system of said plurality of visual approach slope indicator systems;
    compare said current position of said aircraft with said second plurality of data elements; and
    if said comparison of said current position of said aircraft and said second plurality of data elements indicates that said second plurality of data elements includes invalid data, generate a plurality of visual display control signals associated with said one visual approach slope indicator system, wherein at least one visual display control signal of said plurality of visual display control signals represents an invalidity of said plurality of visual display control signals.

2. The system of claim 1, wherein said processing unit is further operable to:
    generate a plurality of color coded visual display control signals associated with said one visual approach slope indicator system, if said comparison of said current position of said aircraft and said second plurality of data elements indicates that said second plurality of data elements includes valid data.

3. The system of claim 1, further comprising:
    a visual display coupled to said processing unit, said visual display operable to display a visual representation of said plurality visual display control signals associated with said one visual approach slope indicator system and a symbol representing an invalidity of said plurality of visual display control signals.

4. The system of claim 1, wherein said at least one visual display control signal is a red colored X symbol.

5. The system of claim 1, wherein said at least one visual display control signal is an international symbol representing "not".

6. The system of claim 1, wherein said at least one visual display control signal is at least one non-color coded visual display control signals associated with said one visual approach slope indicator system.

7. The system of claim 1, wherein said position determination unit comprises at least one of an aircraft navigation system, inertial navigation system, satellite navigation system receiver, VLF/OMEGA, Loran C, VOR/DME, DME/DME, IRS, or Flight Management System.

8. The system of claim 1, wherein said data storage unit comprises an airport/runway information database.

9. The system of claim 1, wherein said one visual approach slope indicator system comprises at least one of a PAPI system, VASI system, airport lighting aid system, tri-colored airport lighting aid system, or pulsating airport lighting aid system.

10. The system of claim 1, wherein said plurality of validity factors includes information associated with an airport or runway including at least one of airport or runway location information, special distance information, or usage limitation information.

11. A visual validity indicator system for a simulated visual glide slope indicator system, comprising:
    an aircraft position sensing device;
    a visual glide slope indicator database; and
    a processor coupled to said aircraft position sensing device and said visual glide slope indicator database, said processor operable to:
    receive a current position of said aircraft from said aircraft position sensing device;
    retrieve visual glide slope indicator information from said visual glide slope indicator database;
    compare said current position of said aircraft with said visual glide slope indicator information; and
    if said comparison of said current position of said aircraft and said visual glide slope indicator information indicates that said visual glide slope indicator information is invalid, generate a plurality of visual display control signals associated with said visual approach slope indicator system, wherein at least one visual display control signal of said plurality of visual display control signals represents an invalidity of said plurality of visual display control signals.

12. A method for displaying validity of visual approach slope indicators, comprising the steps of:
   determining a current position of an aircraft;
   retrieving a plurality of data elements associated with a plurality of validity factors for a visual approach slope indicator system;
   comparing said current position of said aircraft with said plurality of data elements; and
   generating a plurality of visual display control signals associated with said visual approach slope indicator system, wherein at least one visual display control signal of said plurality of visual display control signals represents an invalidity of said plurality of visual display control signals, if a result of the comparison step indicates that said plurality of data elements includes invalid data.

13. The method of claim 12, further comprising the steps of:
   generating a plurality of color coded visual display control signals associated with said visual approach slope indicator system, if a result of the comparison step indicates that said plurality of data elements includes valid data.

14. The method of claim 12, further comprising the steps of:
   displaying a visual representation of said plurality of visual display control signals associated with said visual approach slope indicator system and a symbol representing an invalidity of said plurality of visual display control signals.

15. The method of claim 12, wherein said at least one visual display control signal is a red colored X symbol.

16. The method of claim 12, wherein said at least one visual display control signal is an international symbol representing "not".

17. The method of claim 12, wherein said at least one visual display control signal is at least one non-color coded visual display control signals associated with said visual approach slope indicator system.

18. The method of claim 12, wherein the determining step is performed by at least one of an aircraft navigation system, inertial navigation system, satellite navigation system receiver, VLF/OMEGA, Loran C, VOR/DME, DME/DME, IRS, or Flight Management System.

19. The method of claim 12, wherein said plurality of data elements are stored in an airport/runway information database.

20. The method of claim 12, wherein said visual approach slope indicator system comprises at least one of a PAPI system, VASI system, airport lighting aid system, tri-colored airport lighting aid system, or pulsating airport lighting aid system.

21. The method of claim 12, wherein said plurality of validity factors includes information associated with an airport or runway including at least one of airport or runway location information, special distance information, or usage limitation information.

22. A computer program product, comprising:
   a computer-reabale medium having computer-readable code embodied therein for configuring a computer processor, the computer program product comprising:
   a first executable computer-readable code configured to cause a computer processor to determine a current position of an aircraft;
   a second executable computer-readable code configured to cause a computer processor to retrieve a plurality of data elements associated with a validity of a visual approach slope indicator system;
   a third executable computer-readable code configured to cause a computer processor to compare said current position of said aircraft with said plurality of data elements; and
   a fourth executable computer-readable code configured to cause a computer processor to generate a plurality of visual display control signals associated with said plurality of data elements, wherein at least one visual display control signal represents an invalidity of said plurality of visual display control signals, if a result of the compare operation indicates that said plurality of data elements includes invalid data.

* * * * *